UNITED STATES PATENT OFFICE.

GUSTAV TÜRK, OF LEUWARDEN, NETHERLANDS.

PROCESS OF MAKING PASTE.

SPECIFICATION forming part of Letters Patent No. 412,309, dated October 8, 1889.

Application filed January 2, 1889. Serial No. 295,238. (Specimens.)

*To all whom it may concern:*

Be it known that I, GUSTAV TÜRK, a subject of the Emperor of Austria, residing at Leuwarden, in the Kingdom of the Netherlands, have invented a certain new and useful Method of Extracting Adhesives from Straw-Boilings, of which the following is a specification.

My invention relates to extracting an adhesive paste from straw-boilings in the manufacture of paper; and it consists in taking the water in which the straw has been boiled, and which may contain lime or other substances. This water may be obtained by blowing off the straw-boiler, straining the straw, passing the same through a press, or extracting the water from the straw by a centrifugal or other means. This water is passed through a coarse-sand filter, where it is freed from impurities.

In general practice the "boilings" have a density of about 3° to 4° Baumé in the crude state.

The filtered boilings are placed in an evaporating-pan, which is heated by steam, and evaporated down to twenty-five to fifteen per cent. of their original volume. The product thus obtained forms, when cold, a stiff paste of a brown color, which can be easily and evenly spread on any substance—such as paper boxes, &c.—and can be exposed to the air for several weeks without fermenting. In order to purify this paste so as to make it fit for other purposes, the paste is removed from the evaporating-pan into a deep boiler and cooled to about 50° centigrade and about about one to two per cent. of fresh blood added and brought slowly to the boil. The albumen in the blood incases all the foreign substances in the paste and stiffens by the heat and rises to the surface as dirty scum, when it can be removed by a ladle. This purified paste is made white by mixing three to five per cent. of a solution of sulphite of calcium at 8° Baumé and bringing it quickly to the boil and then drawn off and left to settle. The lime settles to the bottom as a gray-brown mass. If the paste should show signs of too much sulphuric acid, a little carbonate of lime is added to counteract it. The substance thus obtained can be used direct as adhesive paste or as dextrine for making spirits or starch sugar, or instead of resin soap in the manufacture of paper.

The paste gained equals from 2.3 to 2.5 per cent. of the water or seven and one-half to eight per cent. of the straw used.

Having fully described my invention, what I claim, and desire to secure by Letters Patent in the United States, is—

The method of extracting adhesive paste from straw-boilings by filtering the boilings and evaporating the superfluous water, and then purifying the crude paste by mixing it with blood or albumen and afterward with a solution of sulphide of calcium, substantially as described.

In witness whereof I have hereunto set my hand in presence of two witnesses.

GUSTAV TÜRK.

Witnesses:
 A. S. DOCER,
 G. VANDERMEULE.